United States Patent [19]

Itoh et al.

[11] Patent Number: 4,497,894

[45] Date of Patent: Feb. 5, 1985

[54] COLORED SILVER HALIDE PHOTOGRAPHIC PHOTOSENSITIVE MATERIALS

[75] Inventors: Akira Itoh; Akira Takemura, both of Nagaokakyo, Japan

[73] Assignee: Mitsubishi Paper Mills, Ltd., Tokyo, Japan

[21] Appl. No.: 533,818

[22] Filed: Sep. 19, 1983

[30] Foreign Application Priority Data

Sep. 22, 1982 [JP] Japan .................. 57-166353

[51] Int. Cl.³ .................. G03C 1/84; G03C 1/16
[52] U.S. Cl. .................. 430/522; 430/564
[58] Field of Search .............. 430/520, 522, 221, 564

[56] References Cited

U.S. PATENT DOCUMENTS 2,150,695  3/1939  Muehler ................ 430/520
3,738,846  6/1973  Kamano et al. ......... 430/520

FOREIGN PATENT DOCUMENTS 56-001047  1/1981  Japan ................ 430/522

OTHER PUBLICATIONS

*Color Index*, Edition II, p. 13, No. 42051 and No. 42025.

*Primary Examiner*—John E. Kittle
*Assistant Examiner*—Cynthia Hamilton
*Attorney, Agent, or Firm*—Cushman, Darby & Cushman

[57] ABSTRACT

Disclosed is a silver halide photographic photosensitive material which contains at least one dye analogous to a diaminotriphenylmethane dye having sulfo group but which contains, instead of the phenyl group which is not an aminophenyl group, a benzo]b]furan or benzo[b]thiophene which prevents irradiation and halation without discoloration or change during preparation of coating solution or emulsion and giving any adverse effects on photographic characteristics and which is completely and rapidly decolorized during photographic processing procedure.

6 Claims, No Drawings

COLORED SILVER HALIDE PHOTOGRAPHIC PHOTOSENSITIVE MATERIALS

BACKGROUND OF THE INVENTION

This invention relates to a colored silver halide photographic photosensitive material. More particularly, it relates to a silver halide photographic photosensitive material which is provided with novel acutance and antihalation dyestuffs.

It is well known to improve sharpness of photographic images of silver halide photographic photosensitive materials by adding dyes which absorb light scattered by the silver halide grains and reflected light at the emulsion-base, base-air interfaces.

The dyes for this use contained in photosensitive emulsion layer, between the emulsion layer and the support or in back coat layer must neither discolor nor change their spectral characteristics during preparation of photosensitive emulsions. Furthermore, they must not have adverse effect on photographic characteristics such as fogging, desensitization and the like.

Moreover, the dyes must be completely and quickly decolored or dissolved out of the photographic photosensitive material at some stage in the processing procedure. Above all, the dyes must have spectral absorbing characteristics which meet respective objects and have effects of preventing irradiation and halation.

Especially, due to the recent developments of new light sources such as He-Ne laser or light emission diode, development of dyes having spectral absorption maximum at 630–680 nm has been demanded. The polymethine dyes which have been widely used as acutance and antihalation dyes cannot be used for these new light sources. For they become unstable in aqueous solution and gelatin when the number of methine chain is increased in order to extend the absorption maximum to long wavelength side. Although in Japanese Patent Laid-Open Application (Kokai) No. 117926/80 examples of relatively stable pentamethineoxonol dyes are disclosed, these dyes are not stable enough for the practical use. On the other hand, it is known that triphenylmethane dyes represented by Malachite Green are stable dyes which absorb light of long wavelength. However, the absorption maximum cannot be extended over 640 nm even if various substituents are introduced therein.

SUMMARY OF THE INVENTION

The first object of this invention is to provide water-soluble dyes useful for coloration of hydrophilic colloid layers such as gelatin which constitute photographic photosensitive materials.

The second object of this invention is to provide novel dyes which absorb light of long wavelength.

The third object of this invention is to provide novel dyes which are stable in aqueous solutions and gelatin and completely and rapidly decolored and removed during the photographic processing procedure.

The fourth object of this invention is to provide dyes which have no adverse effect on photosensitive emulsion layer.

DESCRIPTION OF THE INVENTION

These objects have been achieved by providing silver halide photographic photosensitive materials which contain at least one diaminotriphenylmethane dye having sulfo group wherein phenyl group other than the aminophenyl group is substituted by a benzo[b]furan or benzo[b]thiophene which bonds to the central carbon atom of the dye at their 2-position.

The objects of this invention cannot be attained by using dyes having a skeleton where benzo[b]furan or benzo[b]thiophene bonds to the central carbon atom of the dye at their 3-position (e.g. reference dyes A and B given hereinafter) or dyes having a skeleton where thiophene bonds to the central carbon at 2-position (e.g., reference dye C given hereinafter).

Especially useful dyes are those which are represented by the following general formula (1):

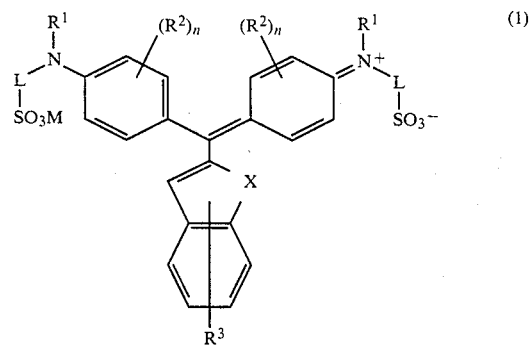

[wherein $R^1$ represents hydrogen atom, an alkyl group (e.g. methyl, ethyl, propyl, butyl, carboxymethyl, hydroxyethyl, benzyl, etc.), an aryl group (e.g., phenyl, tolyl, chlorophenyl, etc.) or an alkenyl group (e.g., allyl, etc.); $R^2$ represents an alkyl group (e.g., methyl, ethyl, benzyl, etc.), an alkoxy group (e.g., methoxy, ethoxy, benzyloxy, etc.), an aryloxy group (e.g., phenoxy, etc.), an alkenyl group (e.g., allyl, etc.) or a halogen atom (e.g., chlorine, bromine, etc.); n represents 0, 1 or 2; $R^3$ represents hydrogen atom, an alkyl group (e.g., methyl, ethyl, propyl, butyl, carboxymethyl, benzyl, etc.), an alkenyl group (e.g., allyl, etc.), a halogen atom (e.g., chlorine, bromine, etc.), nitro group, cyano group, $SO_2R^4$ or $COR^4$ wherein $R^4$ represents hydroxy group, an alkyl group (e.g., methyl, benzyl, etc.) or an aryl group (e.g., phenyl, etc.); L represents an alkylene group (e.g., ethylene, propylene, butylene, etc.); M represents hydrogen atom or other inorganic or organic cation (e.g., an alkali metal, an alkaline earth metal, ammonium, etc.); and X represents oxygen atom or sulfur atom].

Typical examples of the dyes used in this invention are as follows:

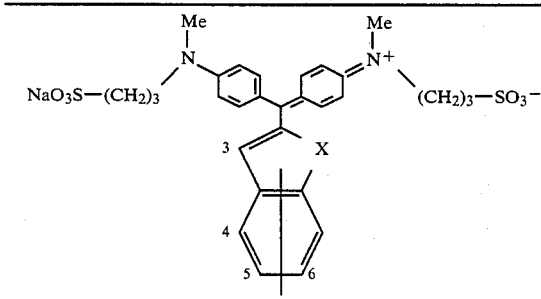

| Dyes | X | R | $\lambda_{H_2O}^{Max}$ (nm) |
|---|---|---|---|
| I | O | H | 660 |
| II | O | 5-Cl | 663 |
| III | O | 5-Me | 659 |

| | | | |
|---|---|---|---|
| IV | O | 5-NO$_2$ | 672 |
| V | S | H | 643 |
| VI | S | 3-Cl | 657 |
| VII | S | 5-Cl | 643 |
| VIII | S | 6-Cl | 645 |
| IX | S | 3-Br | 655 |
| X | S | 3-Me | 644 |

Dye XI

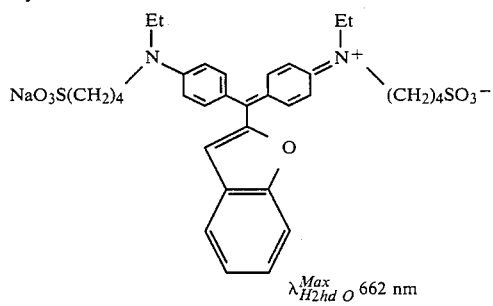

$\lambda^{Max}_{H2hd\ O}$ 662 nm

Dye XII

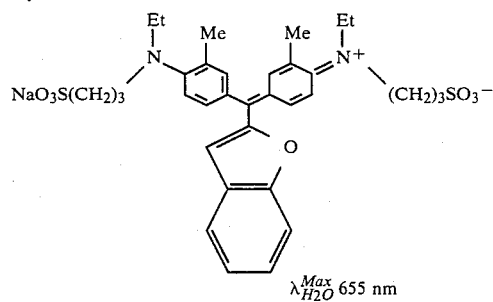

$\lambda^{Max}_{H2O}$ 655 nm

Dye XIII

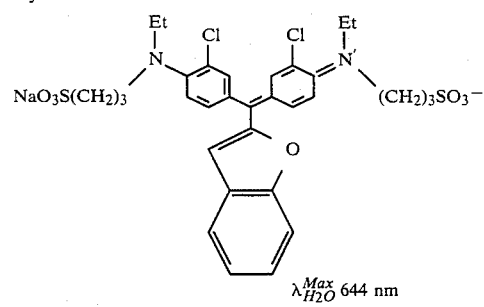

$\lambda^{Max}_{H2O}$ 644 nm

Reference dyes A, B

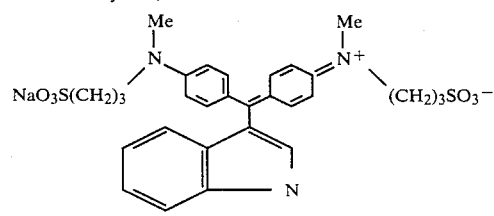

A: X = O  $\lambda^{Max}_{H2O}$ 622 nm

B: X = S  $\lambda^{Max}_{H2O}$ 625 nm

Reference dye C

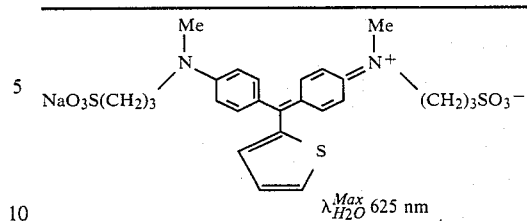

$\lambda^{Max}_{H2O}$ 625 nm

The dyes used in this invention are not limited to the dyes exemplified above. If necessary, two or more of these dyes may be used jointly and moreover, these dyes may be used in combination with dyes having another structure.

The dyes represented by the above general formula (1) can be prepared by the known method which comprises condensing an aniline derivative represented by the following general formula (2) with benzo[b] furan-2-carboxaldehyde or benzo[b]thiophene-2-carboxaldehyde represented by the general formula (3) in the presence of an acid catalyst and subsequently oxidizing the resulting leuco base with a suitable oxidizing agent.

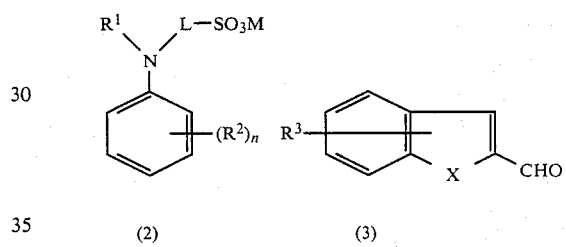

(2)                    (3)

[wherein R$^1$, R$^2$, R$^3$, L, M, X and n are the same as defined for the general formula (1)].

The aniline derivatives represented by the general formula (2) are known compounds and can be easily obtained. The compounds represented by the general formula (3) wherein X=O can be prepared following the method described in Chemical Abstract Vol. 71, 61198h and those of X=S can be synthesized in a similar manner as described in "Journal of the Organic Chemistry", Vol. 23, Page 563.

Typical example of synthesis of the dye of this invention will be explained below.

SYNTHESIS EXAMPLE

Dye III: To a mixture of 0.64 g of 5-methylbenzofuran-2-carboxaldehyde and 1.83 g of 3-(N-methyl-N-phenyl)-aminopropanesulfonic acid was added 25 ml of 1N H$_2$SO$_4$ and the mixture was refluxed for 15 hours. After cooling, this was neutralized with 6N NaOH and water was removed under reduced pressure. To the obtained residue were added 1.0 g of p-chloranil and 25 ml of methanol and the mixture was stirred at room temperature for 19 hours. Compounds which were not dissolved in methanol were filtered off and the filtrate was concentrated and then purified by a silica gel column chromatography to obtain 1.61 g of the dye III which was dark green solid and had a melting point of 247° C. (dec).

Other dyes which are used in this invention can also be synthesized in accordance with the method mentioned in the above synthesis example.

The dyes represented by the above general formula (1) are added to silver halide emulsion layer or protective colloid layers such as back coat layer, precoat layer, intermediate layer, over coat layer, ultraviolet-absorbing layer as an aqueous solution, solutions in methanol, ethanol, cellosolves, glycols, dimethylformamide, dimethylsulfoxide, pyridine, etc., or a mixed solution with these organic solvents and water. Organic or inorganic salts of the dyes can also be used in a similar way.

Amount of these dyes used may very depending on the kind of photographic layers to which they are added, but generally they are coated at a coating amount of about 5 mg to about 1,000 mg per 1 $m^2$ of the photosensitive material.

The silver halide emulsions used in this invention include, for example, those of silver chloride, silver bromide, silver chlorobromide, silver iodobromide, silver chloroiodobromide, etc.

Furthermore, the silver halide emulsions used in this invention may contain a noble metal sensitizer, a sulfur sensitizer or a polyalkylene oxide compound.

The silver halide emulsions used in this invention are spectral sensitized with the commonly used cyanine dyes, merocyanine dyes, etc. Moreover, the photographic materials of this invention may contain additives such as basic mordants such as polymers containing amino group or ammonium group and polymers containing a nitrogen-containing heterocyclic ring, stabilizers, surfactant, hardeners, ultravioletabsorbers, fluorescent brighteners, etc. When the silver halide photographic emulsion is used for color photosensitive materials, it may contain color couplers or dispersants therefor.

As protective colloid for silver halide emulsion, there may be added, besides gelatin, gelatin derivatives such as phthalated gelatin, malonated gelatin, etc., water soluble polymers such as polyvinyl alcohol and polyvinyl pyrrolidone, plastisizers for dimensional stabilization, latex polymers, etc.

The photographic emulsion used in this invention may be coated on supports such as baryta paper, resin coat paper, synthetic paper, natural or synthetic polymeric films such as cellulose triacetate or polyester.

The following are representative examples of forming anti-irradiation layer, anti-halation layer and filter layer using the dyes according to this invention.

EXAMPLE 1

Gelatin (1.55 g) was swollen with 15 ml of water and then dissolved by heating at 40° C. To this gelatin solution were added an aqueous solution of the dyes of this invention as shown in Table 1 or known dyes as shown below (1.84×10$^{-4}$ mol/2.0 ml of water), a hardener, and a surfactant. Water was added to make the total amount 20 ml. Then, each of these colored solutions was coated on a precoated polyester film base at a coating amount of 85 g/$m^2$. Samples thus prepared were heated at 50° C. for 24 hours and cut to rectangles of 8.0×11.5 $cm^2$.

These samples were dipped in D-72 developing solution for 5 seconds or 15 seconds and then were washed with running water for 10 seconds. Then, water drops sticking thereto were absorbed by putting it between filter papers and dried to obtain treated samples. Density of the untreated samples and the treated samples was measured at five points of each sample by Macbeth transmission densitometer TD-504 (using wratten gelatin No. 94 as filter) and the averae value was taken as density of each sample.

The compounds having the following structure were used as known dyes.

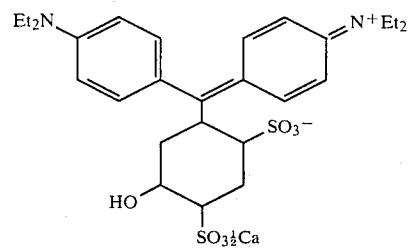

Known dye D $\lambda^{Max}_{H2O}$ 639 nm

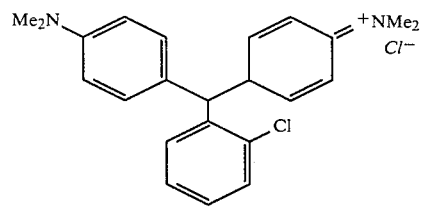

Known dye E $\lambda^{Max}_{H2O}$ 630 nm

Thus obtained results are shown in Table 1, wherein 5 seconds and 15 seconds for the densities after treatment mean dipping in D-72 for 5 seconds and 15 seconds, respectively.

TABLE 1

| Dyes | Initial density | Density after treatment | |
|---|---|---|---|
| | | 5 seconds | 15 seconds |
| I | 0.89 | 0.02 | 0.02 |
| III | 0.92 | 0.03 | 0.03 |
| V | 0.66 | 0.02 | 0.02 |
| XI | 0.82 | 0.03 | 0.03 |
| D | 1.24 | 0.15 | 0.12 |
| E | 0.98 | 0.62 | 0.62 |

As is clear from Table 1, when the dyes of this invention were used, the difference between the initial density and the density after treatment was great, thus, it is recognized that the dyes of this invention can be completely and quickly removed from the photographic material.

EXAMPLE 2

A photographic paper which comprised a polyethylene laminated photographic support having thereon a silver chlorobromide emulsion, a hardener and a surfactant was prepared. Separately, samples were prepared in the same manner except that dye I (0.20 m mol/g AgNO$_3$) of this invention and the following known dye F (0.18 m mol/g AgNO$_3$) were incorporated in the emulsion, respectively.

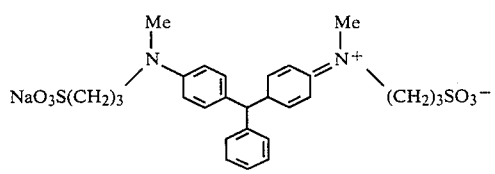

Known dye F $\lambda_{H_2O}^{Max}$ 618 nm

These samples were exposed and then developed with D-72 developing solution at 20° C. for 90 seconds. Sensitivities obtained are shown in Table 2.

TABLE 2

| Dyes | Relative sensitivity |
|---|---|
| None | 100 |
| I | 57 |
| F | No image produced |

As is clear from Table 2, the desensitization effect recognized for the known dye F was greatly improved by using the dye I. Moreover, the sample containing the dye I was rapidly decolorized during the development and neither remaining of dyes nor coloration caused by color restoration were seen.

What is claimed is:

1. A silver halide photographic photosensitive material which comprises a support, a silver halide emulsion layer and a protective colloid layer, at least one of the emulsion layer and the colloid layer containing a dye represented by the following formula:

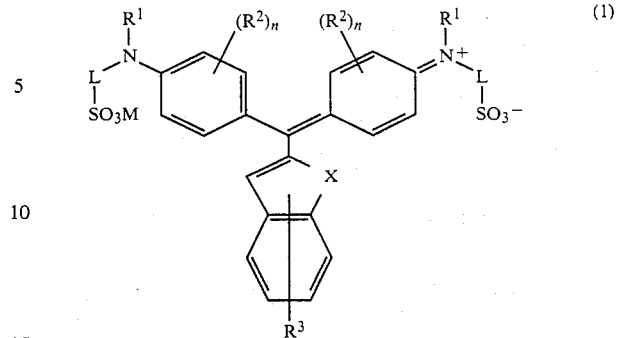

(wherein $R^1$ represents hydrogen atom, an alkyl group, an aryl group or an alkenyl group; $R^2$ represents an alkyl group, an alkoxy group, an aryloxy group, an alkenyl group, a halogen atom; n is 0, 1 or 2; $R^3$ represents hydrogen atom, an alkyl group, an alkenyl group, a halogen atom, nitro group, cyano group, $SO_2R^4$ or $COR^4$ wherein $R^4$ is hydroxyl group, an alkyl group or an aryl group; L represents an alkylene group; M represents hydrogen atom or other inorganic or organic cation; and X represents oxygen atom or sulfur atom).

2. A silver halide photographic photosensitive material according to claim 1 wherein the dye of formula (1) is contained in the emulsion layer.

3. A silver halide photographic photosensitive material according to claim 1 wherein the amount of the dye of formula (1) is about 5 mg/m² to about 1,000 mg/m².

4. A silver halide photographic photosensitive material according to claim 2 wherein the amount of the dye of formula (1) is about 5 mg/m² to about 1,000 mg/m².

5. A silver halide photographic photosensitive material according to claim 1 wherein the dye of formula (1) is contained in the protective colloid layer.

6. A silver halide photographic photosensitive material according to claim 5 wherein the amount of the dye of formula (1) is about 5 mg/m² to about 1,000 mg/m².

* * * * *